United States Patent
Park

(10) Patent No.: US 9,367,750 B2
(45) Date of Patent: Jun. 14, 2016

(54) LANE DEPARTURE WARNING SYSTEM AND METHOD OF CONTROLLING THE SAME

(71) Applicant: HYUNDAI MOBIS Co., Ltd., Yongin-si, Gyeonggi-do (KR)

(72) Inventor: Sang Jun Park, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/554,150

(22) Filed: Nov. 26, 2014

(65) Prior Publication Data
US 2015/0154459 A1 Jun. 4, 2015

(30) Foreign Application Priority Data
Nov. 29, 2013 (KR) .................. 10-2013-0146934

(51) Int. Cl.
*G06K 9/00* (2006.01)
*G06K 9/46* (2006.01)

(52) U.S. Cl.
CPC .......... *G06K 9/00798* (2013.01); *G06K 9/4661* (2013.01)

(58) Field of Classification Search
USPC .................................................. 382/103–107
See application file for complete search history.

(56) References Cited

U.S. PATENT DOCUMENTS

| | | | | |
|---|---|---|---|---|
| 6,819,779 | B1 * | 11/2004 | Nichani | G06K 9/00798 382/104 |
| 2005/0196020 | A1 * | 9/2005 | Comaniciu | G06K 9/00805 382/104 |
| 2006/0184297 | A1 * | 8/2006 | Higgins-Luthman | B60R 1/00 701/41 |
| 2008/0069400 | A1 * | 3/2008 | Zhu | G06K 9/3241 382/103 |
| 2010/0079590 | A1 * | 4/2010 | Kuehnle | G06K 9/00798 348/118 |
| 2010/0228435 | A1 * | 9/2010 | Higgins-Luthman | B60R 1/00 701/36 |
| 2010/0238283 | A1 * | 9/2010 | Kim | G06T 7/0042 348/135 |
| 2012/0008021 | A1 | 1/2012 | Zhang et al. | |
| 2012/0183177 | A1 * | 7/2012 | Ku | G06K 9/00771 382/103 |

FOREIGN PATENT DOCUMENTS

DE 102011106050 A1 1/2012
KR 10-2006-0005428 1/2006

OTHER PUBLICATIONS

M. Baba, et al., "Shadow Removal from a Real Image Based on Shadow Density", In: SIGGRAPH Poster, 2004.
Andres Sanin, et al., "Shadow Detection: A Survey and Comparative Evaluation of Recent Methods", Pattern Recognition, vol. 45, No. 4, p. 1684-1695, 2012.
Oct. 23, 2015, German Office Action for related DE application No. 102014117102.0.

* cited by examiner

*Primary Examiner* — Alex Liew
(74) *Attorney, Agent, or Firm* — Paratus Law Group, PLLC

(57) ABSTRACT

Disclosed is a lane departure warning system. According to an exemplary embodiment of the present invention, the lane departure warning system includes: an image obtaining unit configured to obtain a travelling image; a region of interest setting unit configured to set a predetermined region of the travelling image as a region of interest; and a controller configured to remove a shadow component included in the region of interest when brightness of the region of interest satisfies a predetermined condition, and detect a line in the region of interest in which the shadow component is removed.

12 Claims, 8 Drawing Sheets

(A)

(B)

(A)

(B)

(C)

LANE DEPARTURE WARNING SYSTEM AND METHOD OF CONTROLLING THE SAME

CROSS-REFERENCE TO RELATED APPLICATIONS

The present application claims priority to Korean Patent Application Number 10-2013-0146934 filed Nov. 29, 2013, the entire contents of which the application is incorporated herein for all purposes by this reference.

BACKGROUND

The present invention relates to a lane departure warning system, and a method of controlling the same, and more particularly, to a lane departure warning system, which recognizes a line in an image, detects whether a vehicle deviates from the line, and notifies a driver of the departure from the line, and a method of controlling the same Various systems for safe driving have been applied to a recently produced vehicle or have been developed for application, and one of them is a lane departure warning system for detecting whether a vehicle deviates from a line due to carelessness of a driver, outputting a warning signal when it is detected that the vehicle deviates from the line, and assisting the driver to safely drive on a travelling road.

The land departure warning system (LDWS) has, for example, a scheme using a camera mounted at one side of an inside mirror of a vehicle, a scheme using a camera mounted in a rear side (for example, a trunk), and a scheme using an optical sensor installed in a lower part of a vehicle.

The LDWS analyzes an image obtained through a camera and recognizes a line, so that line recognizing performance is considerably different depending on to weather, lighting, a road state, and the like during travelling.

That is, in a process of extracting line information from a road image by a line recognizing system of a vehicle, a shadow generated by sun light, a lighting, or the like is a core component disturbing data processing of recognizing a line from a travelling image, and as the greater number of shadow components are included in the travelling image, the line recognizing system may erroneously recognize a line even though the line is not an actual line, or it is difficult to accurately discriminate the shadow from the line in some cases. When a driver operates a vehicle in a time zone in which sun shines, and a shadow by an object (for example, a guard rail or another vehicle) around a road is present at a position adjacent to a line, or at a position overlapping the line, a probability that the line recognizing system of the vehicle fails to recognize a line is increased.

Accordingly, recently, a demand for a technique for more accurately discriminating a shadow by sun light from an actual line has gradually increased.

RELATED ART LITERATURE

Patent Document

Korean Patent Application Laid-Open No. 10-2006-0005428: Lane Departure Warning Device for Vehicle (Jan. 18, 2006).

SUMMARY

The present invention has been made in an effort to provide a lane departure warning system, which is capable of accurately notifying a driver of information about whether a vehicle deviates from a line by decreasing or removing a shadow component from a travelling image received from a camera, and a method of controlling the same.

Objects of the present invention are not limited to the objects described above, and other objects that are not described will be clearly understood by a person skilled in the art from the description below.

An exemplary embodiment of the present invention provides a lane departure warning system mounted in a vehicle, including: an image obtaining unit configured to obtain a travelling image; a region of interest setting unit configured to set a predetermined region of the travelling image as a region of interest; and a controller configured to remove a shadow component included in the region of interest when brightness of the region of interest satisfies a predetermined condition, and detect a line in the region of interest in which the shadow component is removed.

The region of interest setting unit may set one or more regions of interest having a predetermined width and length.

The region of interest setting unit may set the region of interest at each of a left side and a right side based on a center axis of a travelling direction.

The region of interest setting unit may adjust an inclination of the region of interest based on a travelling direction.

The controller may classify pixels included in the region of interest for each of a plurality of predetermined brightness sections, calculate the number of pixels included in each brightness section, and generate a histogram for the calculated number of pixels for each brightness section.

When the number of pixels having brightness with a predetermined value or smaller has a predetermined ratio or greater in the histogram, the controller may remove a shadow component included in the region of interest, and detect a line in the region of interest in which the shadow component is removed.

The controller may calculate a distance between the detected line and the vehicle, and generate a warning signal when the calculated distance is smaller than a predetermined value.

The lane departure warning system may further include a warning outputting unit configured to receive the warning signal, and generating at least one of a visual effect, an audible effect, and a tactile effect.

Another exemplary embodiment of the present invention provides a method of controlling a lane departure warning system mounted in a vehicle, including: obtaining a travelling image; setting a predetermined region of the travelling image as a region of interest; determining whether brightness of the region of interest satisfies a predetermined condition; removing a shadow component included in the region of interest when it is determined that the brightness of the region of interest satisfies the predetermined condition; and detecting a line in the region of interest in which the shadow component is removed.

The setting of the predetermined region of the travelling image as the region of interest may include setting one or more regions of interest having a predetermined width and length.

The setting of the predetermined region of the travelling image as the region of interest may include setting the region of interest at each of a left side and a right side based on a center axis of a travelling direction.

The setting of the predetermined region of the travelling image as the region of interest may include adjusting an inclination of the region of interest based on a travelling direction of a vehicle.

The determining of whether the brightness of the region of interest satisfies the predetermined condition may include: classifying pixels included in the region of interest for each of a plurality of predetermined brightness sections, calculating the number of pixels included in each brightness section, and generating a histogram for the calculated number of pixels for each brightness section; and determining whether the number of pixels having brightness with a predetermined value or smaller has a predetermined ratio or greater in the histogram.

The removing of the shadow component included in the region of interest may include, when the number of pixels having brightness with the predetermined value or smaller has the predetermined ratio or greater in the histogram, removing a shadow component included in the region of interest.

The method may further include calculating a distance between the detected line and the vehicle, and generating a warning signal when the calculated distance is smaller than a predetermined value.

The method may further include receiving the warning signal, and generating at least one of a visual effect, an audible effect, and a tactile effect.

An effect according to the present invention will be described below.

According to at least one of the exemplary embodiments of the present invention, it is possible to provide the lane departure warning system which is capable of accurately notifying a driver of information on whether the vehicle deviates from the lane by decreasing or removing a shadow component in a travelling image received from a camera, and a method of controlling the same.

According to at least one of the exemplary embodiments of the present invention, it is possible to decrease the amount of calculating demanded for detecting a line, and more rapidly provide a warning to a driver when a vehicle deviates from a line by detecting a line only in a region of interest, which is a region including the line, in the travelling image.

According to at least one of the exemplary embodiments of the present invention, it is possible to select whether to remove a shadow component according to a characteristic of a road environment in which a vehicle travels by generating a histogram for brightness of a region of interest, and removing a shadow component included in a travelling image only when information included in the generated histogram satisfies a predetermined condition.

The effects of the present invention are not limited to the aforementioned effects, and other effects, which are not mentioned above, will be clearly understood by those skilled in the art from descriptions of the claims.

DETAILED DESCRIPTION

Figure 1:
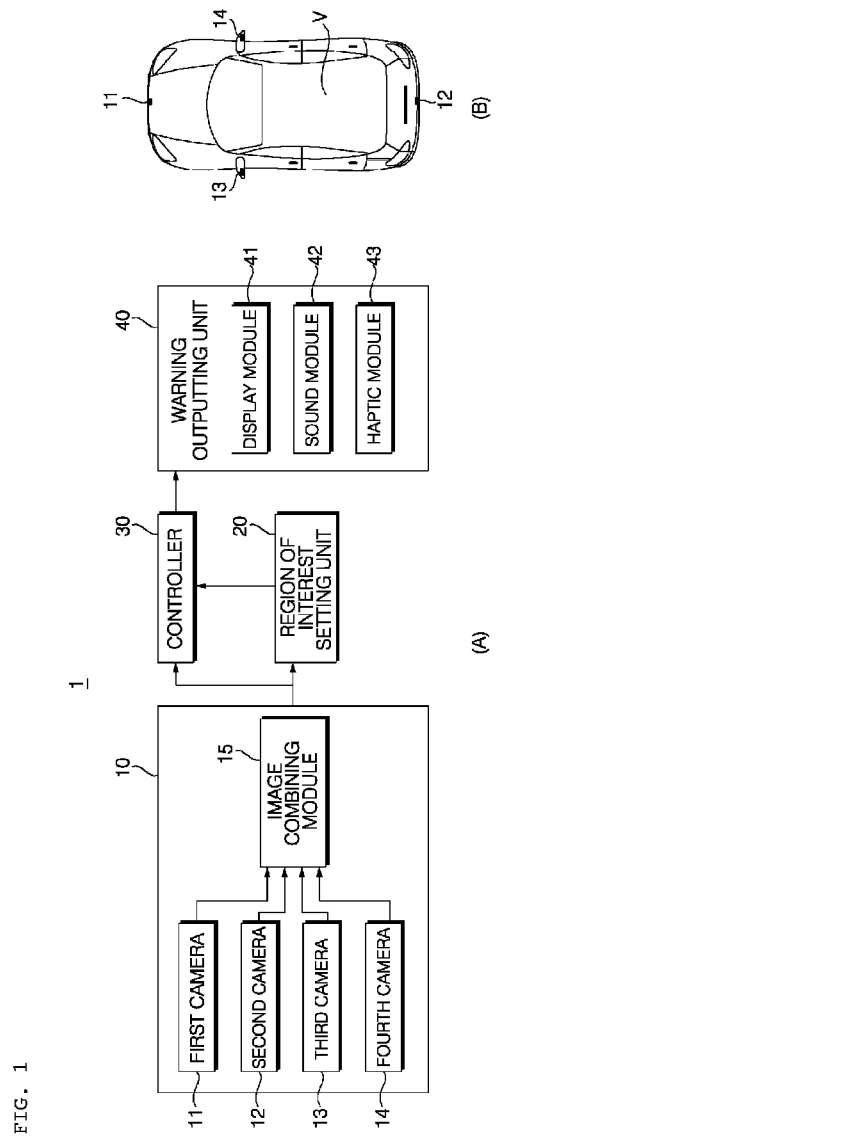
FIG. 1 is block diagrams schematically illustrating a configuration of a lane departure warning system according to a first exemplary embodiment of the present invention.

Various advantages and features of the present invention and methods accomplishing them will become apparent from the following detailed description of exemplary embodiments with reference to the accompanying drawings. However, the present invention is not limited to the exemplary embodiments set forth below, and may be embodied in various other forms. The exemplary embodiments introduced herein are provided to make disclosed contents thorough and complete and sufficiently transfer the spirit of the present invention to those skilled in the art, and the present invention will only be defined by the scope of the claims. Like reference numerals indicate like elements throughout the specification.

Accordingly, in some exemplary embodiments, well-known process steps, publicly known structures, and publicly known technologies are not described in detail in order to avoid obscure interpretation of the present invention.

Terms including an ordinal number, such as first and second, are used for describing various constituent elements, but the constituent elements are not limited by the terms. The terms are used only to discriminate one constituent element from another constituent element.

The terms used in the present specification are for explaining the embodiments rather than limiting the present invention. Unless particularly stated otherwise in the present specification, a singular form also includes a plural form. The word "comprises" and/or "comprising" used in the present specification will be understood to imply the inclusion of stated constituents, steps, and/or operations but not the exclusion of any other constituents, steps, and/or operations. The term "and/or" includes each of the mentioned items or all of the combinations including one or more items.

Exemplary embodiments described in the present specification will be described with reference to a perspective view, a cross-sectional view, a side view, and/or a schematic view, which are ideal example diagrams of the present invention. Accordingly, a form of the example diagram may be modified by a manufacturing technology and/or an allowable error. Accordingly, the exemplary embodiments of the present invention are not limited to the illustrated specific form, but include a change in a form generated according to a manufacturing process. Further, in each diagram illustrated in the present invention, each constituent element is illustrated to be slightly expanded or reduced considering convenience of a description.

Hereinafter, a lane departure warning system according to an exemplary embodiment of the present invention will be described in detail with reference to the accompanying drawings.

(A) and (B) of FIG. 1 illustrate block diagrams schematically illustrating a configuration of a lane departure warning system 1 according to a first exemplary embodiment of the present invention.

First, referring to (A) of FIG. 1, the lane departure warning system 1 according to the first exemplary embodiment of the present invention includes an image obtaining unit 10, a region of interest setting unit 20, and a controller 30. Further, the lane departure warning system 1 according to the first exemplary embodiment of the present invention may further include a warning outputting unit 40.

The image obtaining unit 10 may include one or more cameras. The image obtaining unit 10 may obtain a travelling image for a predetermined distance of a front side, a rear side, or a lateral side of a vehicle through a camera.

Referring to (A) of FIG. 1, the number of one or more cameras 11, 12, 13, and 14 included in the image obtaining unit 10 may be four so as to obtain images of a front side, a rear side, a left side, or a right side of a vehicle V, but less or more cameras may be included according to a view angle, a mounted position, or the like of the camera.

The cameras 11, 12, 13, and 14 are mounted in the vehicle V, and photograph a physical space existing within a predetermined distance from the vehicle V and generate an image signal. Here, the cameras 11, 12, 13, and 14 may be super wide angle cameras having a view angle of 180 degrees or more.

The first camera 11 may be mounted at a front side of the vehicle V to photograph a front image. The first camera 11 may be mounted on a part of a front bumper or a front glass or the like. The second camera 12 may be mounted at a rear side of the vehicle V to photograph a rear image. The second camera 12 may be mounted at a part of a rear bump, or an upper or lower side of a license plate. The third camera 13 may be mounted at a left side of the vehicle V to photograph a surrounding image of the left side. The third camera 13 may be mounted at a part of a left side mirror or a part of a front fender of the vehicle V. The fourth camera 14 may be mounted at a right side of the vehicle V to input a surrounding image of the right side. The fourth camera 14 may be mounted at a part of a right side mirror or a part of the front fender of the vehicle V.

In this case, the image obtaining unit 10 may further include an image combining module 15 for combining image signals of respective channels generated by the plurality of cameras 11, 12, 13, and 14. When the image signals of the respective channels are combined by the image combining module 154, an around view image may be generated.

The region of interest setting unit 20 sets a predetermined region of the travelling image as a region of interest. The region of interest is a region designated as a target in which a line is detected, and the region of interest setting unit 20 may set one or more regions of interest for the travelling image. Each region of interest may have a predetermined width and length.

When a plurality of regions of interest is set, the region of interest setting unit 20 may differently set a width and a length for each region of interest. The width and the length of the region of interest may be predetermined based on an input of a user.

The region of interest setting unit 20 may set a region of interest at a left side and a right side based on a center axis of a travelling direction of the vehicle V. That is, the region of interest setting unit 20 sets two regions of interest as regions for detecting a left line and a right line with respect to a road on which the vehicle V travels.

The region of interest setting unit 20 may adjust an inclination of a region of interest based on a travelling direction of the vehicle V. For example, when the vehicle V corners to a left side, the region of interest setting unit 20 may adjust the region of interest to be inclined to the left side.

The controller 30 determines whether brightness of the region of interest meets a predetermined condition. Particularly, the controller 30 may classify pixels included in the region of interest for each of a plurality of predetermined brightness sections, calculate the number of pixels included in each brightness section, and generate a histogram for the calculated number of pixels for each brightness section. For example, when the controller 30 uses 8 bits for displaying illumination of each pixel included in the region of interest, the number of pixels included in the brightness section may be set to a maximal of 256 ($=2^8$).

The controller 30 may calculate illumination of each of the plurality of pixels included in the region of interest, set an brightness section including the calculated illumination, and calculate the number of pixels included in each brightness section. Accordingly, the controller 30 may generate a histogram having the brightness section as a bottom side, and the number of pixels included in each brightness section as a height.

The controller 30 may analyze the generated histogram, and determine whether the histogram satisfies the predetermined condition (that is, a ratio of the number of pixels having brightness with a predetermined value or smaller to the number of entire pixels included in the region of interest is equal to or greater than a predetermined ratio).

As a result of the determination, when it is determined that the ratio of the number of pixels having brightness with the predetermined value or smaller to the number of entire pixels included in the region of interest is equal to or greater than the predetermined ratio, the controller 30 removes a shadow component included in the region of interest, and detects a line in the region of interest in which the shadow component is removed. That is, the case where the brightness of the region of interest satisfies the predetermined condition means the case where low illumination components (that is, the shadow components) are included in the region of interest as many as the line cannot be accurately recognized, so that the shadow components are removed before the line is detected in the region of interest.

In this case, those skilled in the art may easily recognize that the shadow component included in the region of interest may be removed by utilizing a publicly-known shadow removing algorithm and the like. Further, the controller 30 may detect a line existing in the region of interest by applying an edge detection method to the region of interest in which the shadow component is removed. In this case, at least one of the already publicly-known various methods, such as a sobel edge method and a canny edge method, may be utilized as the edge detection method, so that a detailed description thereof will be omitted.

The controller 30 may calculate a distance between the line detected from the region of interest and the vehicle, and generate a warning signal when the calculated distance is smaller than a predetermined value (that is, when the vehicle deviates from the road). The warning outputting unit 40 may receive the warning signal generated by the controller 30, and generate at least one of a visual effect, an audible effect, and a tactile effect.

Particularly, the warning outputting unit 40 may include at least one of a display module 41, a sound module 42, and a haptic module 43. When the warning outputting unit 40 receives a warning signal, the warning outputting unit 40 may display a message or an image notifying a line departure situation through the display module 41, or output a sound or a beep sound notifying a line departure situation through the sound module 42. Otherwise, the warning outputting unit 40 may generate a vibration having a predetermined pattern for a driver's seat or pull a seat belt through the haptic module 43.

Hereinafter, for convenience of the description, it is assumed that the image obtaining unit 10 includes only the first camera 11 mounted at the front side of the vehicle V, and obtains a travelling image for the front side.

Figure 2:
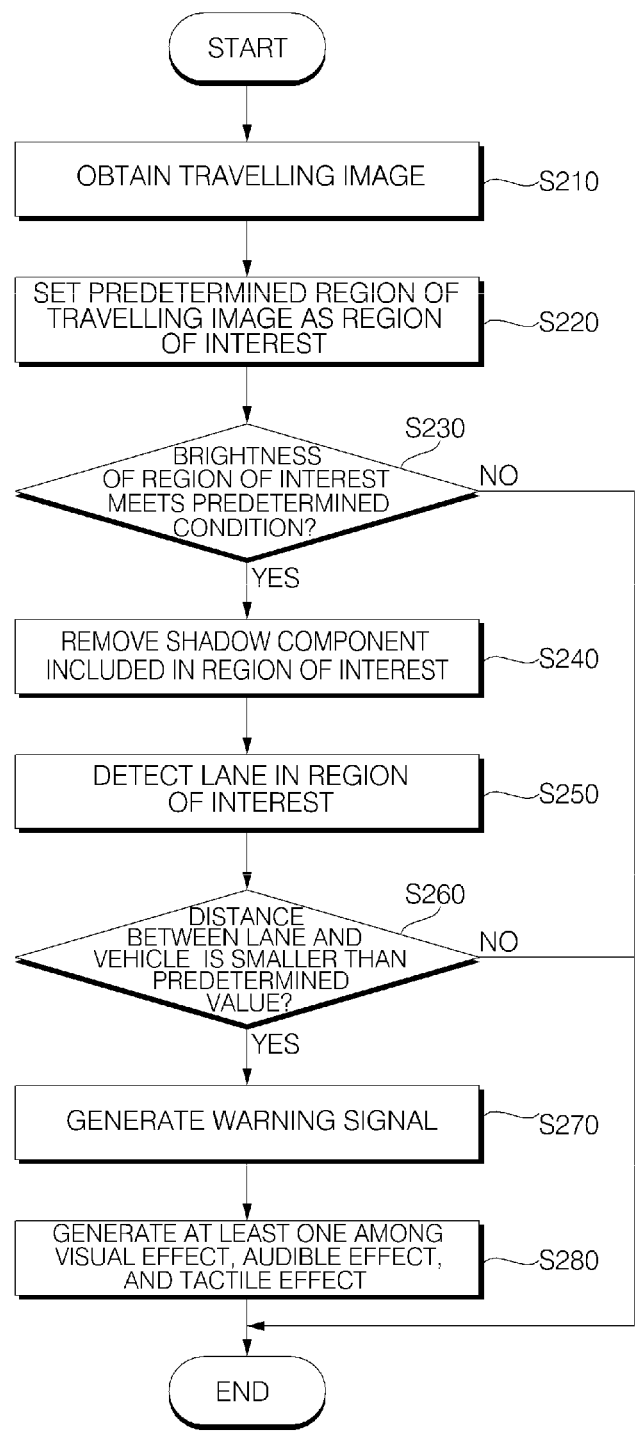
FIG. 2 is a flowchart illustrating a control method of the lane departure warning system according to the first exemplary embodiment of the present invention.

FIG. 2 is a flowchart illustrating a control method of the lane departure warning system 1 according to the first exemplary embodiment of the present invention.

Referring to FIG. 2, first, the lane departure warning system 1 according to the first exemplary embodiment of the present invention obtains a travelling image (S210). For example, the image obtaining unit 10 may obtain an image of a front side in a travelling direction of the vehicle through the camera 11 mounted at a part of the front side of the vehicle V.

Next, a predetermined region of the travelling image is set as a region of interest (S220). The region of interest is a region designated as a target in which a line is detected, and the region of interest setting unit 20 may set one or more regions of interest for the travelling image.

In this case, one region of interest having a predetermined width and length may be set at each of a left side and a right side based on a center axis of the travelling direction of the vehicle V.

The region of interest setting unit 20 may adjust an inclination of the region of interest based on the travelling direction of the vehicle V.

Next, it is determined whether brightness of the region of interest satisfies a predetermined condition (S230). Here, the predetermined condition may mean a state where a ratio of the number of pixels having brightness with a predetermined value or smaller to the number of entire pixels included in the region of interest is equal to or greater than a predetermined ratio.

The operation S230 may include operation S232 of generating a histogram, and operation S234 of analyzing the histogram and determining whether the brightness of the region of interest satisfies the predetermined condition. Particularly, the controller 30 may classify the pixels included in the region of interest for each of a plurality of predetermined brightness sections, calculate the number of pixels included in each brightness section, and generate a histogram for the calculated number of pixels for each brightness section in operation S232. Next, the controller 30 may determine whether the ratio of the number of pixels having brightness with the predetermined value or smaller to the number of pixels included in the region of interest in the histogram is equal to or greater than the predetermined ratio in operation S232.

Next, as a result of the determination of operation S230, when it is determined that the brightness of the region of interest satisfies the predetermined condition, a shadow component included in the region of interest is removed (S240). The shadow component included in the region of interest may be removed by utilizing a publicly-known shadow removing algorithm, and the like, so that a detailed description thereof will be omitted.

Then, a line is detected from the region of interest in which the shadow component is removed (S250). Already publicly-known various methods, such as a sobel edge method and a canny edge method, may be utilized as the edge detection method applied to the detection of the line from the image.

In the meantime, according to the first exemplary embodiment of the present invention, the control method of the lane departure warning system 1 may further include, when the line is detected in operation S250, calculating a distance between the detected line and the vehicle, and determining whether the calculated distance is smaller than a predetermined value (S260), generating a warning signal when it is determined that the distance between the detected line and the vehicle is smaller than the predetermined value (S270), and generating at least one of a visual effect, an audible effect, and a tactile effect based on the warning signal (S280).

Figure 3:
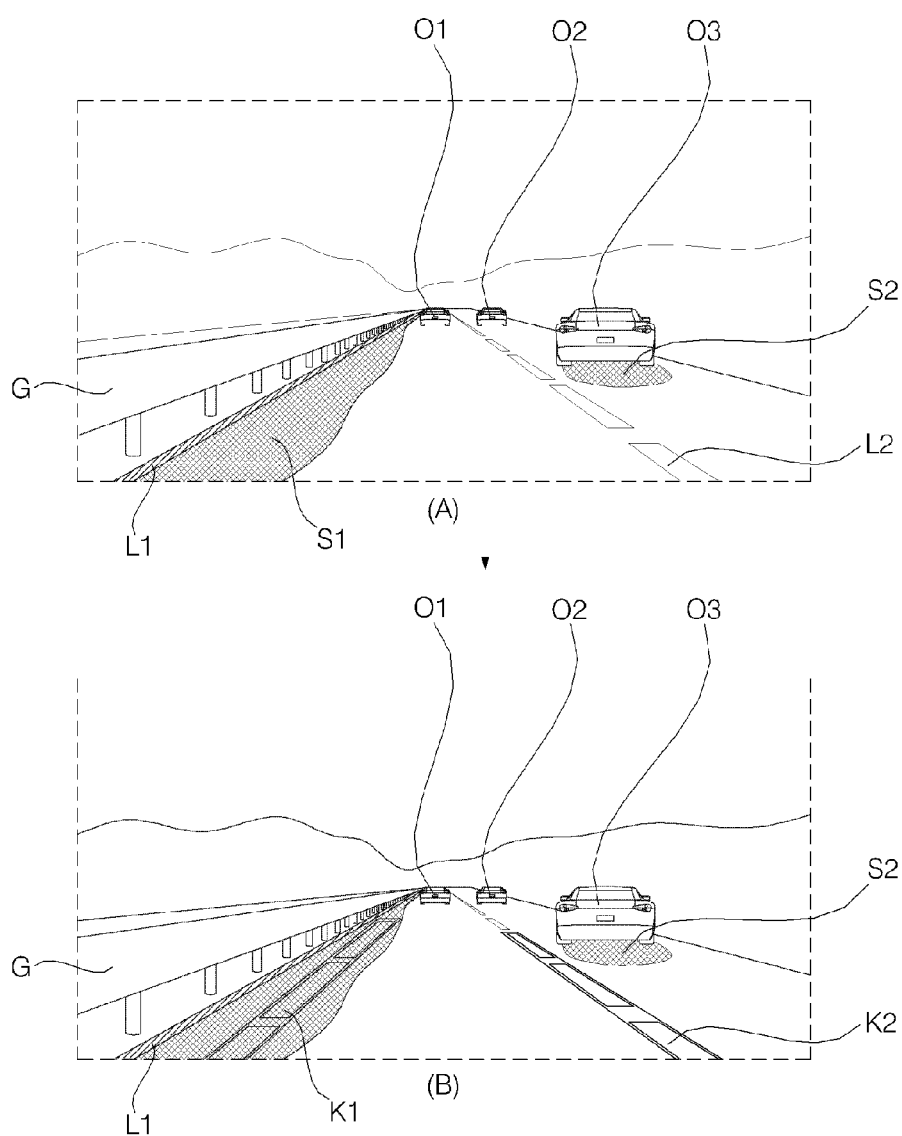
FIG. 3 illustrates an example in which a line is erroneously recognized due to a shadow component included in a travelling image.

FIG. 3 illustrates an example in which a line is erroneously recognized due to a shadow component included in a travelling image.

First, (A) of FIG. 3 illustrates an example of a travelling image obtained by the image obtaining unit 10, and it can be seen that the travelling image includes a guard rail G, lines L1 and L2, and other vehicles O1, O2, and O3. In this case, the travelling image includes shadows S1 and S2 shown according to hiding of sun light by the guard rail G and another vehicle O3.

(B) of FIG. 3 is an example in which the lane departure warning system 1 according to the related art erroneously recognizes the shadow S1 included in the travelling image as the line when the shadows S1 and S2 included in (A) of FIG. 1 are not removed.

Referring to (B) of FIG. 3, the shadow S2 by another vehicle O3 is present in a relatively small region outside the right line L2 not to influence detection of the line, but the shadow S1 due to the guard rail G is present while overlapping the left line L1, so that the lane departure warning system 1 according to the related art may erroneously determine a contour line of the shadow S1, not the actual left line L1, as a contour line of the line, and thus display a virtual line K1 at a position corresponding to the contour line of the shadow S1. In this case, a virtual line K2 may be displayed even on a position corresponding to the right line L2 which is not influenced by the shadow to be properly detected.

In this case, the virtual line K is closer to the vehicle than the actual line L1, so that the lane departure warning system 1 generates a warning even in a travelling situation in which the vehicle does not actually deviate from the line, and the generated warning may be a disturbing factor of safe driving of a driver.

In the above, it has been described that the shadow due to the guard rail disturbs the recognition of the line, but the recognition of the line may be disturbed even by a shadow generated by other objects, such as other vehicles and a soundproof wall as a matter of course.

In the meantime, in contrast to the case where the shadow disturbs the accurate detection of the line as illustrated in (B) of FIG. 3, when a region, in which a shadow is generated, in the travelling image is very small, or a shadow is removed even in the case where the shadow is faint by more than a predetermined level, reliability and a lifespan of the lane departure warning system 1 may deteriorate due to unnecessary calculations.

Accordingly, the first exemplary embodiment of the present invention suggests the lane departure warning system 1 capable of improving reliability and expanding a lifespan of the lane departure warning system 1 by performing line recognition only on a region of interest, not the entire travelling image, and removing a shadow only when brightness of the region of interest satisfies a predetermined condition.

Figure 4:
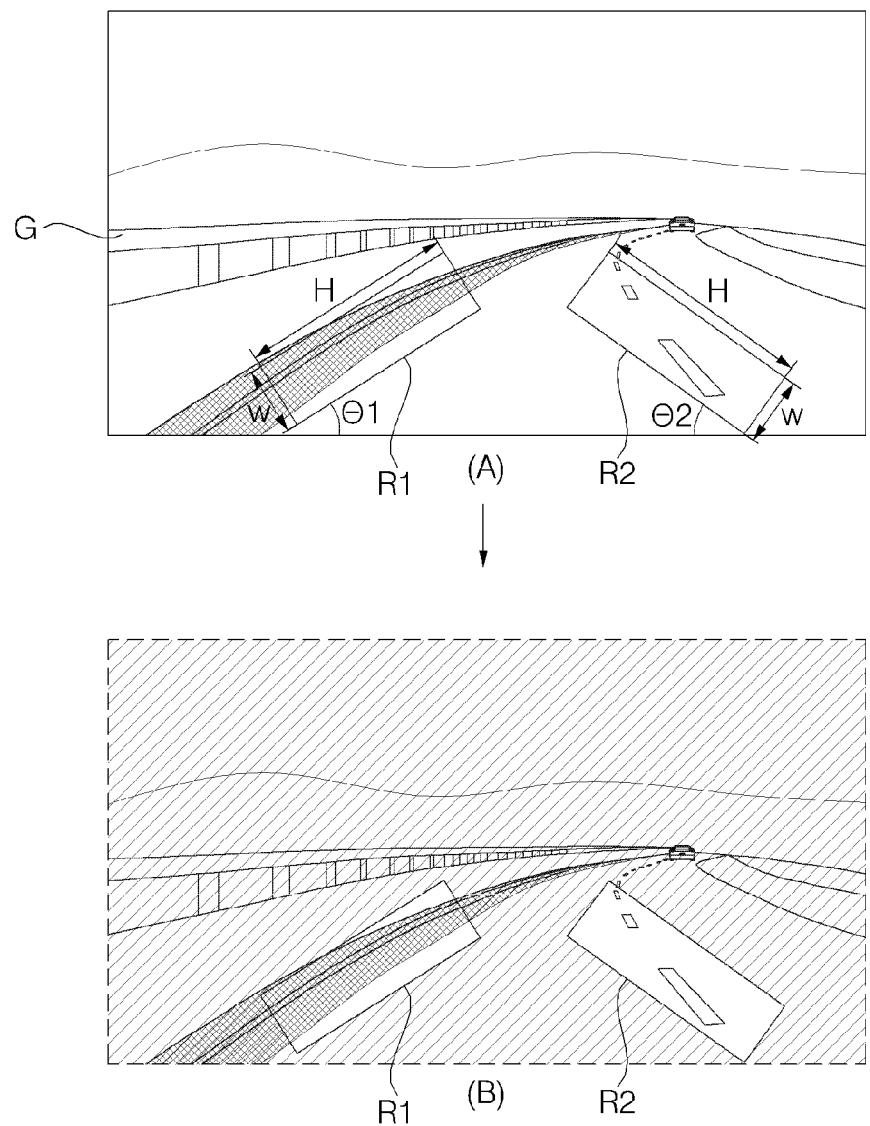
FIG. 4 illustrates an example in which a region of interest is set in the travelling image according to the first exemplary embodiment of the present invention.

FIG. 4 illustrates an example in which a region of interest is set in the travelling image according to the first exemplary embodiment of the present invention.

The region of interest described above may be a rectangular region having a predetermined width W and height H, but is not limited thereto, and may be regions having various shapes, such as an ellipse, a diamond, and a trapezoid.

Referring to (A) of FIG. 4, a left region of interest R1 and a right region of interest R2 divided based on the travelling direction of the vehicle can be seen. The region of interest setting unit 20 may preset so as to set two regions of interest R1 and R2 in the travelling image based on the travelling direction as illustrated in (A) of FIG. 4. In this case, in order to give perspective, the region of interest setting unit 20 may incline two regions of interest R1 and R2 in the travelling image so that two regions of interest R1 and R2 have predetermined inclinations θ1 and θ2, respectively.

When the region of interest setting unit 20 completes the setting of the regions of interest R1 and R2, the controller 30 does not perform any information processing for detecting a line for a region except for the regions of interest R1 and R2 as illustrated in (B) of FIG. 4, thereby reducing the amount of calculation.

In the meantime, although it is not illustrated in the drawing, the region of interest setting unit 20 may separately adjust the inclinations θ1 and θ2 of the regions of interest in response to the travelling direction (particularly, a sharp curve section of a road) of the vehicle.

Figure 5:
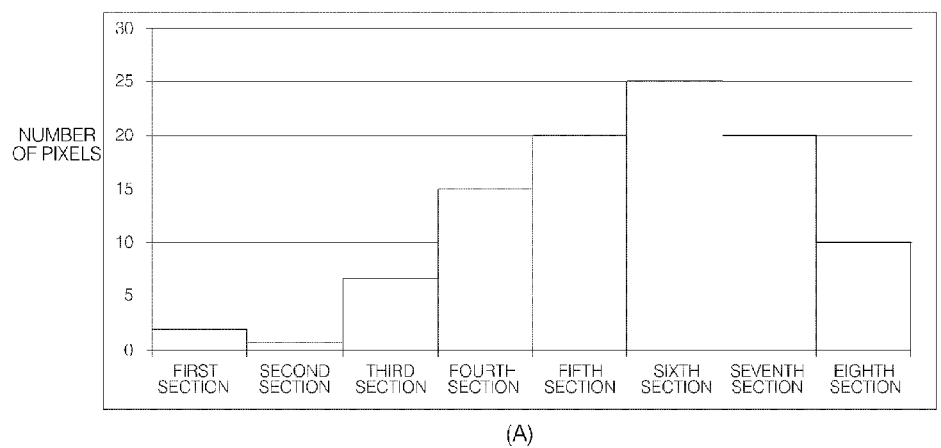
FIG. 5 illustrates an example of a histogram generated for the region of interest according to the first exemplary embodiment of the present invention.
Figure 5:
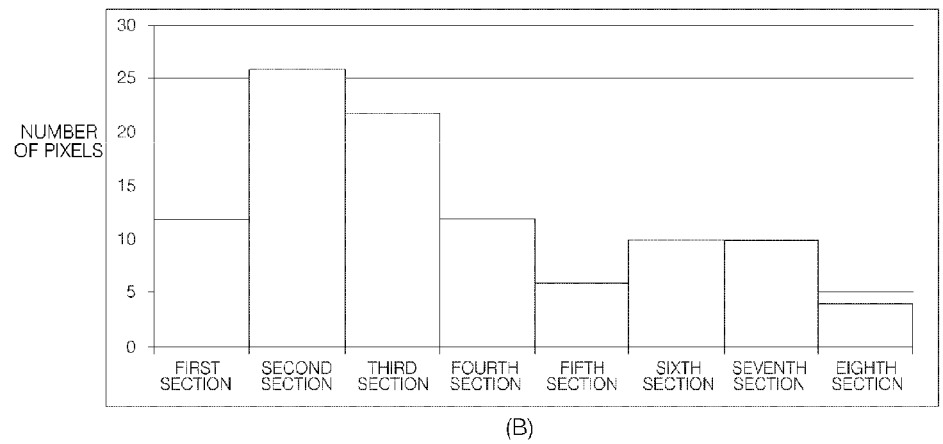

FIG. 5 illustrates an example of a histogram generated for two regions of interest illustrated in FIG. 4. For convenience of the description, it is assumed hereinafter that the number of pixels included in each of the left region of interest R1 and the right region of interest R2 is 100, and illumination may be expressed by 0 to 255 stages by using 8 bits per pixel, and an brightness section is preset as a total of eight sections including a first section (illumination of 0 to 31 stages), a second section (illumination of 32 to 63 stages), a third section (illumination of 64 to 95 stages), a fourth section (illumination of 96 to 127 stages), a fifth section (illumination of 128 to 159 stages), a sixth section (illumination of 160 to 191 stages), a seventh section (illumination of 192 to 223 stages), and an eighth section (illumination of 224 to 255 stages), and illumination is increased from the first section to the eighth section.

First, (A) of FIG. 5 illustrates a histogram generated for the right region of interest R2 illustrated in FIG. 4. Referring to FIG. 4 together, there is no object, such as a guard rail, hiding light emitted by sun light or a lighting around the right region of interest R1, so that a shadow is not present in the right region of interest R2. Accordingly, as illustrated in (A) of FIG. 5, compared to a histogram for illumination of the left region of interest R1, which is to be described below, in the histogram for illumination of the right region of interest R2, the number of pixels included in the low brightness sections (the fourth or lower sections) is relatively small, and the number of pixels included in the high brightness sections (the fifth or greater sections) is relatively great.

(B) of FIG. 5 illustrates an example of a histogram generated for the left region of interest R1 illustrated in FIG. 4. Referring to FIG. 4 together, the guard rail G is present around the left region of interest R1, and sun light is hidden by the guard rail G, so that it can be seen that the shadow S is present within the left region of interest R1. Accordingly, as illustrated in (B) of FIG. 5, compared to the histogram for illumination of the right region of interest R2 illustrated in (A) of FIG. 5, in the histogram for illumination of the left region of interest R1, the number of pixels included in the low brightness sections (the fourth or lower sections) is relatively great, and the number of pixels included in the high brightness sections (the fifth or greater sections) is relatively small.

For example, when it is set that a shadow component is removed only when the number of pixels having illumination equal to or smaller than that of the third section (illumination of 64 to 95 stages) is equal to or greater than ⅔ of the number of entire pixels included in the region of interest, the number of pixels having illumination equal to or smaller than that of the third section (illumination of 64 to 95 stages) in the right region of interest R2 having the histogram illustrated in (A) of FIG. 5 is a total of 10, which is smaller than ⅔ of the number of entire pixels, so that the controller 30 does not remove the shadow component included in the right region of interest R2.

By contrast, the number of pixels having illumination equal to or smaller than that of the third section (illumination of 64 to 95 stages) in the left region of interest R1 having the histogram illustrated in (B) of FIG. 5 is a total of 60, which is equal to or greater than ⅔ of the number of entire pixels, so that the controller 30 removes the shadow component included in the left region of interest R1.

That is, even when the number of regions of interest set in one travelling image is two or more, the controller 30 selectively determines whether to remove a shadow for each region of interest, so that it is possible to decrease the amount of unnecessary calculation consumed due to the uniform removal of the shadow for all of the plurality of regions of interest.

Figure 6:
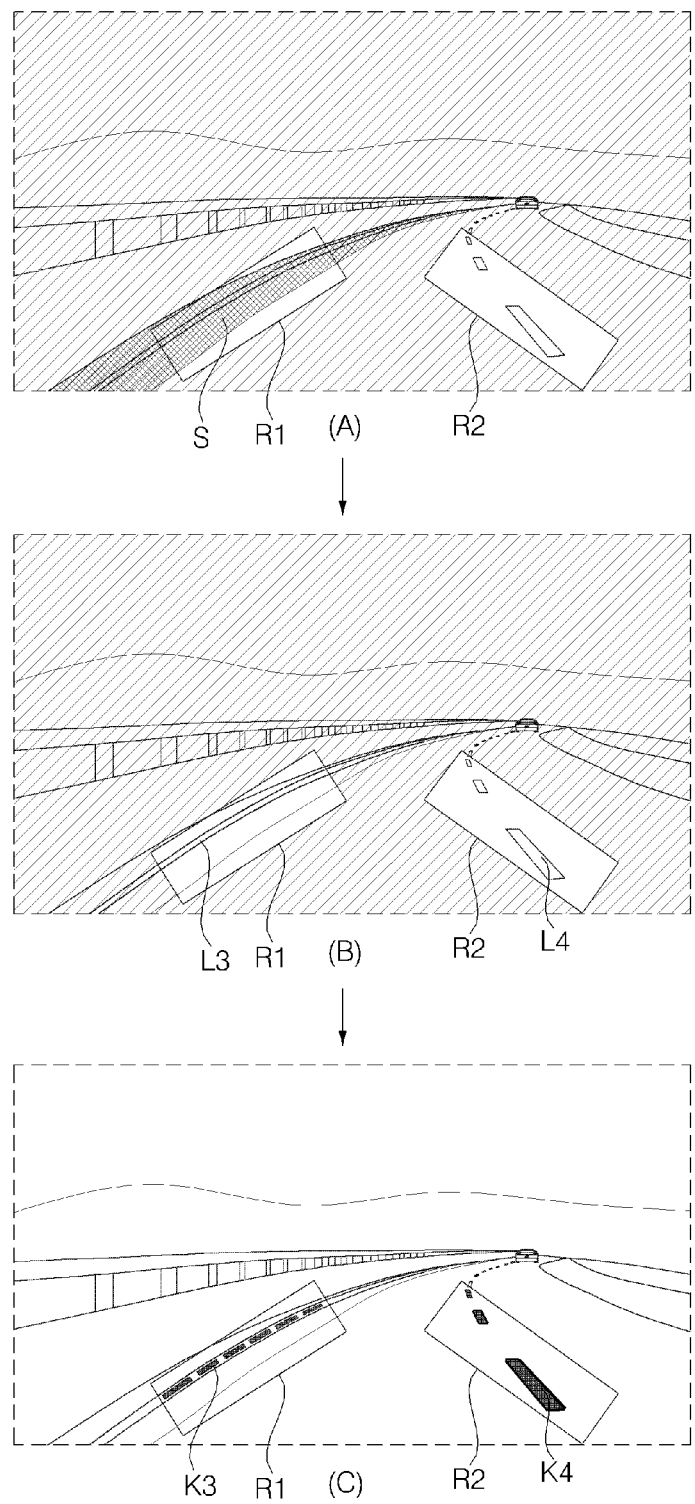
FIG. 6 illustrates an example in which a line is detected by removing a shadow component included in the region of interest according to the first exemplary embodiment of the present invention.

FIG. 6 illustrates an example in which a line is detected by removing a shadow component included in the region of interest according to the first exemplary embodiment of the present invention. Particularly, FIG. 6 illustrates an example in which a line existing in the left region of interest R1 is detected based on a result of the analysis of the histogram according to FIG. 5.

First, the controller 30 obtains the left region of interest R1, in which the shadow component is removed, as illustrated in (B) of FIG. 6 by applying the shadow removing method to the left region of interest R1 illustrated in (A) of FIG. 6. The controller 30 may detect a line L3 by extracting a contour line existing in the left region of interest R1, in which the shadow component is removed.

When an actual line is properly detected, the controller 30 may display the virtual line K3 emphasizing the detected line L3 while overlapping the actual line L3 as illustrated in (C) of FIG. 6.

In the meantime, an actual line L4 existing in the right region of interest R2, on which the removal of the shadow is not performed, may be detected by the same method as the aforementioned method for the left region of interest R1, and a virtual line K4 emphasizing the detected right line L4 may be displayed while overlapping the actual line L4 as illustrated in (C) of FIG. 6.

Figure 7:
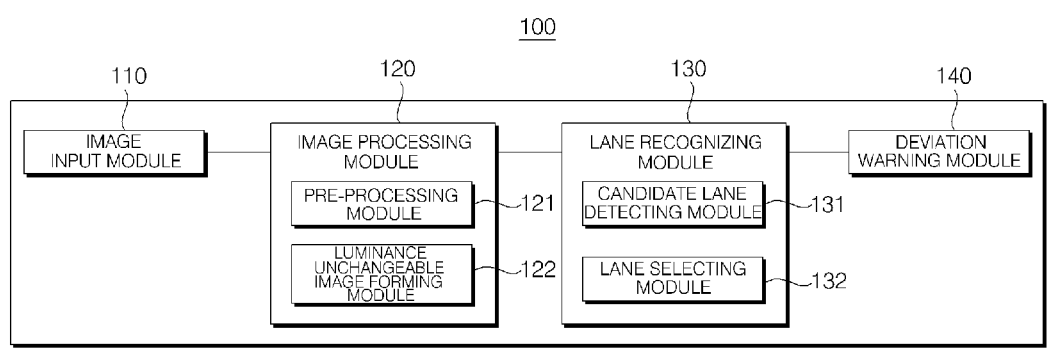
FIG. 7 is a block diagram schematically illustrating a configuration of a lane departure warning system according to a second exemplary embodiment of the present invention.

FIG. 7 is a block diagram schematically illustrating a configuration of a lane departure warning system according to a second exemplary embodiment of the present invention.

As illustrated in FIG. 7, a lane departure warning system 100 according to a second exemplary embodiment of the present invention may include an image input module 110, an image processing module 120, a line recognizing module 130, and a departure warning module 140.

The image input module 110 obtains an image having specific resolution and a color space format through a camera included in a vehicle in real time, and the image input module 110 may obtain a front or rear color image of the vehicle.

The color image input from the image input module 110 may be input as RGB images to be processed, or may be divided into YCbCr channels to be used. In the second exemplary embodiment of the present invention, an original color image input from the image input module 110 may be divided into images of three RGB channels, and then an illumination invariant image forming module 122 may generate a chromaticity image for an image of each channel.

The image processing module 120 is provided for the purpose of pre-processing an image and generating an illumination invariant image so as to recognize a line from the color image input from the image input module 110, and may include an image pre-processing module 121 for correcting resolution, correcting a color space, removing a noise, and correcting an image of the input image, and the illumination invariant image forming module 122 for generating an illumination invariant image from the pre-processed image.

The image pre-processing module 121 may remove a noise and correct the image by performing a filtering operation on the color image input through the image input module 110 or the image of the three RGB channels. In general, a noise, such as high frequency image information, may be removed through the filtering operation by performing the filtering operation, such as low frequency pass filtering, on the input image in order to remove the noise and the correct the image.

The illumination invariant image forming module 122 may generate a chromaticity image for each color channel in the images of the three RGB channels of the pre-processed original color image. The chromaticity image may be generated for each of the RGB color channels, and chromaticity images c1, c2, and c3 for the respective RGB may be generated by Equation 1 below.

$$c1 = \frac{R}{\sqrt[3]{RGB}} \quad c2 = \frac{G}{\sqrt[3]{RGB}} \quad c3 = \frac{B}{\sqrt[3]{RGB}} \quad \text{[Equation 1]}$$

When the chromaticity images c1, c2, and c3 for the respective color channels are generated, logging may be performed on the chromaticity image of each color channel. The reason of performing the logging is that a pixel value of each chromaticity image may be greater than a bit depth.

The illumination invariant image forming module 122 may calculate weight values X1 and X2 by using each chromaticity image on which logging is performed. The weight values X1 and X2 may be calculated by Equation 2 below.

$$X1 = \frac{1}{\sqrt{2}}[\log(c1) - \log(c2)] \quad \text{[Equation 2]}$$
$$X2 = \frac{1}{\sqrt{6}}[\log(c1) + \log(c2) - 2\log(c3)]$$

An illumination invariant image may be generated by Equation 3 below by using the calculated weighted values X1 and X2.

$$I = X1 \cos\theta + X2 \sin\theta \quad \text{[Equation 3]}$$

Here, θ may be a fixed constant. The illumination invariant image I generated by the aforementioned illumination invariant image forming module 122 may be an original input image having the RGB format, or an image in which a shadow region is decreased, compared to a brightness image Y having the YCbCr format converted from the original input image.

The line recognizing module 130 is provided for the purpose of recognizing a line from the illumination invariant image generated by the image processing module 120, and may include a candidate line detecting module 131 for detecting candidate lines in the illumination invariant image by a line detecting filter, and a line selecting module 132 for selecting a line among the candidate lines.

The line recognizing module 130 of the second exemplary embodiment may filter a line component in only one illumination invariant image I generated by the illumination invariant image forming module 122 as described above, in contrast to filtering a line component for each of the images of three channels (that is, RGB or YCbCr) in the related art, so that it is possible to expect a decrease in a time and the amount of calculation consumed for the filtering by a maximum of ⅓ of those of the related art.

The candidate line detecting module 131 may detect a candidate line recognized as a line from the illumination invariant image I, and the candidate line may be detected by various methods.

For example, the candidate lines may be detected by applying an edge filter or a line emphasizing filter to the illumination invariant image, and the edge filter may search for a part forming a border in the image by using a difference in brightness in each pixel in an X-axis direction and an Y-axis direction in image coordinates and detect the candidate line. The line emphasizing filter may express a bright line to be more noticeable compared to surrounding light and shade by using an average value of light and shade to detect the candidate line.

The departure warning module 140 may calculate a distance between the detected line and the vehicle, determine whether the vehicle deviates from the line, and warn the departure of the vehicle.

Figure 8:
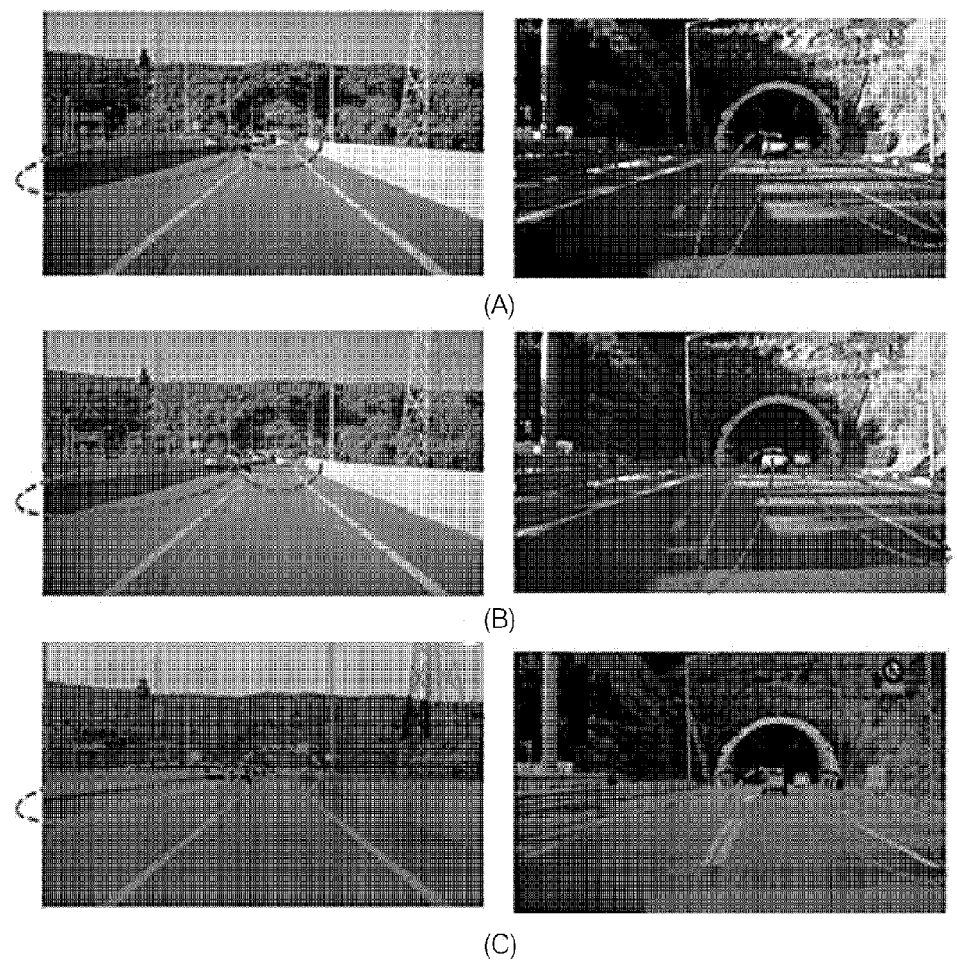
FIG. 8 illustrates schematic diagrams illustrating a comparison of a color image, a brightness image, and an illumination invariant image according to the second exemplary embodiment of the present invention.

(A)-(C) of FIG. 8 illustrate a comparison of a color image, a brightness image, and an illumination invariant image according to the second exemplary embodiment of the present invention.

Referring to dotted line regions of images illustrated in (A)-(C) of FIG. 8, it can be seen that a shadow region of an illumination invariant image (see (C) of FIG. 8) generated by the lane departure warning system 100 according to the second exemplary embodiment of the present invention is decreased compared to a color input image (see (A) of FIG. 8) input from the image input module 110 and a brightness image (see (B) of FIG. 8) formed of brightness components extracted from the color input image. Accordingly, the lane departure warning system 100 according to the second exemplary embodiment of the present invention is capable of more clearly recognizing a lane area.

Systems, apparatuses, and methods consistent with this disclosure may be implemented as instructions on a non-transitory computer-readable storage medium. The system may be implemented by one or more Central Processing Units (CPU) having circuitry configured to control execution of the various functions performed by the image obtaining unit 10, the region of interest setting unit 20, the controller 30, and the warning outputting unit 40.

The lane departure warning system of the present invention has been described with reference to the exemplary embodiments of the present invention, but those skilled in the art will understand that the present invention may be implemented in other specific forms without changing the technical spirit or an essential feature thereof. Thus, it is to be appreciated that embodiments described above are intended to be illustrative in every sense, and not restrictive. The scope of the present invention is represented by the claims to be described below rather than the detailed description, and it is to be interpreted that the meaning and scope of the claims and all the changes or modified forms derived from the equivalent concept thereof come within the scope of the present invention.

What is claimed is:

1. A lane departure warning system mounted in a vehicle, comprising: one or more central processing unit having circuitry configured to:
   obtain a travelling image;
   set a predetermined region of the travelling image as a region of interest;

classify each pixel of a plurality of pixels included in the region of interest into a brightness section of a plurality of predetermined brightness sections corresponding to pixel illumination, calculate a number of pixels in the region of interest included in each brightness section, and generate a histogram with the calculated number of pixels for each brightness section; and remove a shadow component included in the region of interest when a ratio of a number of pixels classified into brightness sections having pixel illumination of a predetermined value or smaller to a total number of the plurality of pixels is greater than or equal to a predetermined ratio, and detect a line in the region of interest in which the shadow component is removed.

2. The lane departure warning system of claim 1, wherein the circuitry is configured to set one or more regions of interest, each one of the regions of interest having a predetermined width and length.

3. The lane departure warning system of claim 2, wherein the circuitry is configured to set the region of interest at each of a left side and a right side based on a center axis of a travelling direction.

4. The lane departure warning system of claim 1, wherein the circuitry is configured to adjust an inclination of the region of interest based on a travelling direction.

5. The lane departure warning system of claim 1, wherein the circuitry is further configured to calculate a distance between the detected line and the vehicle, and generate a warning signal when the calculated distance is smaller than a predetermined value.

6. The lane departure warning system of claim 5, wherein the circuitry is further configured to receive the generated warning signal, and generate a warning output comprising at least one effect selected from a group consisting of a visual effect, an audible effect, and a tactile effect.

7. A non-transitory computer-readable storage medium having embodied thereon a program, which when executed by a computer causes the computer to execute a method of controlling a lane departure warning system mounted in a vehicle, the method comprising:

obtaining a travelling image;

setting a predetermined region of the travelling image as a region of interest;

classifying each pixel of a plurality of pixels included in the region of interest into a brightness section of a plurality of predetermined brightness sections corresponding to pixel illumination, calculating a number of pixels in the region of interest included in each brightness section, and generating a histogram with the calculated number of pixels for each brightness section;

determining whether a ratio of a number of pixels classified into brightness sections having pixel illumination of a predetermined value or smaller to a total number of the plurality of pixels is greater than or equal to a predetermined ratio;

removing a shadow component included in the region of interest when it is determined that a ratio of the number of pixels classified into the brightness sections having pixel illumination of the predetermined value or smaller to the total number of the plurality of pixels is greater than or equal to the predetermined ratio; and detecting a line in the region of interest in which the shadow component is removed.

8. The non-transitory computer-readable storage medium of claim 7, wherein the setting of the predetermined region of the travelling image as the region of interest includes setting one or more regions of interest having a predetermined width and length.

9. The non-transitory computer-readable storage medium of claim 8, wherein the setting of the predetermined region of the travelling image as the region of interest includes setting the region of interest at each of a left side and a right side based on a center axis of a travelling direction.

10. The non-transitory computer-readable storage medium of claim 7, wherein the setting of the predetermined region of the travelling image as the region of interest includes adjusting an inclination of the region of interest based on a travelling direction of a vehicle.

11. The non-transitory computer-readable storage medium of claim 7, the method further comprising:

calculating a distance between the detected line and the vehicle, and generating a warning signal when the calculated distance is smaller than a predetermined value.

12. The non-transitory computer-readable storage medium of claim 11, the method further comprising:

receiving the warning signal, and generating at least one effect selected from a group consisting of a visual effect, an audible effect, and a tactile effect.

* * * * *